(12) United States Patent
Wang et al.

(10) Patent No.: US 11,510,354 B2
(45) Date of Patent: Nov. 29, 2022

(54) FOLDABLE SPADE

(71) Applicant: TAIGU CHANGLIN SHOVEL CO., LTD., Jinzhong (CN)

(72) Inventors: Qiang Wang, Jinzhong (CN); Baojun Zhang, Jinzhong (CN); Dingbo Zhang, Jinzhong (CN); Haobo Xu, Jinzhong (CN); Yixiao Wang, Jinzhong (CN); Xinyin Zhang, Jinzhong (CN); Zhiying Du, Jinzhong (CN)

(73) Assignee: Taigu Changlin Shovel Co., Ltd., Jinzhong (CN)

( * ) Notice: Subject to any disclaimer, the term of this patent is extended or adjusted under 35 U.S.C. 154(b) by 283 days.

(21) Appl. No.: 16/965,138

(22) PCT Filed: Oct. 15, 2019

(86) PCT No.: PCT/CN2019/111143
§ 371 (c)(1),
(2) Date: Jul. 27, 2020

(87) PCT Pub. No.: WO2020/151264
PCT Pub. Date: Jul. 30, 2020

(65) Prior Publication Data
US 2021/0227740 A1    Jul. 29, 2021

(30) Foreign Application Priority Data

Jan. 25, 2019 (CN) .......................... 201910072472.0
Jan. 25, 2019 (CN) .......................... 201920129070.5

(51) Int. Cl.
*A01B 1/02* (2006.01)
*A01B 1/08* (2006.01)
(Continued)

(52) U.S. Cl.
CPC ................ *A01B 1/022* (2013.01); *A01B 1/08* (2013.01); *A01B 1/20* (2013.01); *A01B 1/225* (2013.01);
(Continued)

(58) Field of Classification Search
CPC . B25F 1/003; B25F 1/006; B25F 1/04; B25G 1/04; A01B 1/022; A01B 1/08; A01B 1/20; A01B 1/225
(Continued)

(56) References Cited

U.S. PATENT DOCUMENTS 1,500,132 A * 7/1924 Hummelgard ......... A01B 1/022
  294/51
4,700,420 A * 10/1987 Belanger ................ B25F 1/006
  294/51

(Continued)

*Primary Examiner* — Hadi Shakeri
(74) *Attorney, Agent, or Firm* — Bay State IP, LLC (57) ABSTRACT

The present invention discloses a multifunctional folding spade, which comprises a spade plate and a spade handle, a turntable is welded at the tail end of the spade plate, a spade handle sleeve is provided at the head end of the spade handle, a socket is provided at the head end of the spade handle sleeve, a part of the turntable body is inserted into the socket, the turntable and the spade handle sleeve are provided with matching rotation holes, and a pin shaft passes through the rotation holes to realize the rotating connection between the turntable and the spade handle; the turntable body is further provided with a plurality of angle adjusting holes circumferentially, a locking hole is provided with at the tail end of the spade handle sleeve correspondingly, a locking bolt is provided at one side of the locking hole.

8 Claims, 7 Drawing Sheets

(51) Int. Cl.
*A01B 1/20* (2006.01)
*A01B 1/22* (2006.01)
*B25F 1/00* (2006.01)
*B25F 1/04* (2006.01)
*B25G 1/04* (2006.01)
*B25G 1/08* (2006.01)

(52) U.S. Cl.
CPC .............. *B25F 1/003* (2013.01); *B25F 1/006* (2013.01); *B25F 1/04* (2013.01); *B25G 1/04* (2013.01); *B25G 1/08* (2013.01)

(58) Field of Classification Search
USPC .......................................................... 7/116
See application file for complete search history.

(56) References Cited

U.S. PATENT DOCUMENTS

| | | | |
|---|---|---|---|
| 6,948,208 B1 * | 9/2005 | Schlenner | B26B 29/025 |
| | | | 294/51 |
| 9,119,337 B2 * | 9/2015 | Frati | A01B 1/022 |
| D875,484 S * | 2/2020 | Workman | D7/650 |
| 2008/0110029 A1 * | 5/2008 | Ryan | F41C 27/20 |
| | | | 30/155 |
| 2020/0120918 A1 * | 4/2020 | Doberenz | A01G 3/00 |
| 2021/0197355 A1 * | 7/2021 | Levand | B26B 11/006 |

\* cited by examiner

FOLDABLE SPADE

CROSS REFERENCE TO RELATED APPLICATION

This application is for entry into the U.S. National Phase under § 371 for International Application No. PCT/CN2019/111143 having an international filing date of Oct. 15, 2019, and from which priority is claimed under all applicable sections of Title 35 of the United States Code including, but not limited to, Sections 120, 363, and 365(c) and which in turn claims priority under 35 USC 119 to Chinese Patent Applications No. 2019100724720 and No. 2019201290705 filed on Jan. 25, 2019.

TECHNICAL FIELD

The present invention relates to the technical field of outdoor tools, and in particular, to a multifunctional folding spade.

BACKGROUND

The folding spade has the advantages of small size and easy portability when used outdoors. However, the existing folding spade has the defect that it cannot be quickly and accurately positioned during the folding use. Moreover, the existing folding spade is relatively heavy when being carried outdoors, which is not conducive to being carried outdoors. It is also easy to lose accessories on the spade handle and folding spade when used outdoors.

SUMMARY

The object of the present invention is to provide a multi-functional folding spade to solve the problems of the prior art described above, which is capable of being quickly and accurately folded and positioned, light in weight, and not easy to lose accessories, and also has a variety of practical functions for outdoor operations.

To achieve the above object, the present invention provides the following solutions.

The present invention provides a multifunctional folding spade, comprising a spade plate and a spade handle, wherein a turntable is welded at the tail end of the spade plate, a spade handle sleeve is provided at the head end of the spade handle, a socket is provided at the head end of the spade handle sleeve, a part of the turntable body is inserted into the socket, the turntable and the spade handle sleeve are provided with matching rotation holes, and a pin shaft passes through the rotation holes to realize the rotating connection between the turntable and the spade handle; the turntable body is further provided with a plurality of angle adjusting holes circumferentially, a locking hole is provided with at the tail end of the spade handle sleeve correspondingly, a locking bolt is provided at one side of the locking hole, a positioning marble is provided at the other side of the locking hole opposite to the locking bolt, the turntable is rotated so that the positioning marble is capable of sinking into any of the angle adjusting holes to position the turntable, and the locking end inside the locking bolt is screwed into the angle adjusting hole at the other side of the spade handle sleeve to lock the turntable.

Preferably, a retaining shell is further sleeved outside the locking bolt, the inner diameter of the retaining shell is smaller than the outer diameter of the locking end inside the locking bolt, and the retaining shell is welded to the spade handle sleeve.

Preferably, the turntable body is further provided with a plurality of weight-reducing holes.

Preferably, a longitudinal jaw is further provided at the head end of the spade handle sleeve, a groove jaw is provided on the turntable body in cooperation with the jaw, so that the head end of the spade handle sleeve and the turntable are capable of forming a scissor jaw; and the spade handle sleeve at the other side of the longitudinal jaw is capable of forming a crossed binding jaw at the edge of the turntable body.

Preferably, a nail puller is molded at the edge of the turntable.

Preferably, one side of the spade plate is provided with a thickened hacking knife, and saw teeth are processed at the edge of the other side of the spade plate.

Preferably, a bottle opener and an umbrella rope knife are further provided at the edge of the side of the spade plate provided with the saw teeth, and the body of the spade plate is symmetrically provided with two hexagonal wrench holes at both sides of the turntable.

Preferably, the back surface of the spade plate is further provided with a hammer surface, and the hammer surface is welded to the bottom of the turntable.

Preferably, the spade handle is provided with a plurality of sections, and comprises a first spade handle, a second spade handle and a third spade handle in order from the head end to the tail end, wherein the head end of the first spade handle is threadedly connected to the spade handle sleeve, the tail end of the first spade handle is threadedly connected to a locking base, the interior of the locking base is a T-shaped cavity, the head end of the second spade handle is provided with a locking head, the locking head is a T-shaped locking head provided in cooperation with the T-shaped cavity, a locking nut is sleeved outside the locking head; the first spade handle and the second spade handle are connected by an elastic soft rope, one end of the elastic soft rope is connected to the head end of the first spade handle, and the other end thereof is connected to the locking head at the head end of the second spade handle through the inner cavity of the first spade handle.

Preferably, an outdoor knife and a fire rod are further provided in the cavities of the second spade handle and the third spade handle, respectively, and a compass is further inlaid at the tail end of the third spade handle.

Compared with the prior art, the present invention has achieved the following beneficial technical effects.

The multifunctional folding spade provided by the present invention has the advantages of good strength and light weight, and at the same time, has the functions of spading, digging, chopping, sawing, digging, picking, cutting, hammering, peeling, mowing, firing, guiding, etc. The multifunctional folding spade is foldable, fast in connection, easy to carry, and not easy to lose, and it is an ideal tool for outdoor activities.

BRIEF DESCRIPTION OF THE DRAWINGS

In order to more clearly explain the embodiments of the present invention or the technical solutions in the prior art, the drawings required in the embodiments will be briefly introduced hereinafter. Obviously, the drawings in the following description are only some embodiments of the present invention. For those skilled in the art, other drawings may be obtained based on these drawings without paying creative labor.

In the figures: 1—a spade plate, 11—a thickened hacking knife, 12—saw teeth, 13—a bottle opener, 14—an umbrella rope knife, 15—a hexagonal wrench hole, 16—a hammer surface, 2—a turntable, 21—a first angle adjusting hole, 22—a second angle adjusting hole, 23—a third angle adjusting hole, 24—a fourth angle adjusting hole, 25—a weight-reducing hole, 26—a scissor jaw, 27—a binding jaw, 28—a nail puller, 3—a pin shaft, 4—a locking bolt, 5—a positioning marble, 6—a retaining shell, 31—a spade handle sleeve, 32—a first spade handle, 33—a second spade handle, 34—a third spade handle, 35—a locking base, 36—a locking head, 37—a locking nut, 38—a elastic flexible rope, 39—an outdoor knife, 40—a fire rod, 41—a compass.

DESCRIPTION OF THE EMBODIMENTS

The technical solutions in the embodiments of the present invention will be described clearly and completely in conjunction with the accompanying drawings in the embodiments of the present invention. Obviously, the described embodiments are only some embodiments of the present invention, rather than all the embodiments. Based on the embodiments of the present invention, all other embodiments obtained by those skilled in the art without paying creative labor fall within the protection scope of the present invention.

The object of the present invention is to provide a multifunctional folding spade to solve the problems in the prior art.

In order to make the above objects, features and advantages of the present invention more obvious and understandable, the present invention will be further described in detail in conjunction with the accompanying drawings and specific embodiments.

This embodiment provides a multifunctional folding spade, as shown in FIGS. 1-5, comprising a spade plate 1 and a spade handle, wherein a turntable 2 is welded at the tail end of the spade plate 1, a spade handle sleeve 31 is threadedly connected to the head end of the spade handle, a socket is provided at the head end of the spade handle sleeve 31, a part of the turntable body 2 is inserted into the socket, the turntable 2 and the spade handle sleeve 31 are provided with matching rotation holes, and a pin shaft 3 passes through the rotation holes to realize the rotating connection between the turntable 2 and the spade handle; the turntable body 2 is further provided with a plurality of angle adjusting holes circumferentially, a locking hole is provided with at the tail end of the spade handle sleeve 31 correspondingly, a locking bolt 4 is provided at one side of the locking hole, a positioning marble 5 is provided at the other side of the locking hole opposite to the locking bolt 4, the turntable 2 is rotated so that the positioning marble 5 is capable of sinking into any of the angle adjusting holes to position the turntable 2, and the locking end inside the locking bolt 4 is screwed into the angle adjusting hole at the other side of the spade handle sleeve 31 to lock the turntable 2. In this embodiment, the positioning marble 5 is provided so that the folding spade can be quickly and accurately positioned when being used, or can quickly find the angle adjusting hole blindly when there is no light or no eyes are needed to look at the angle adjusting hole. The folding spade can be quickly unfolded to find the station required for the folding spade quickly, and the station is fixedly used with a locking screw.

Figure 1:
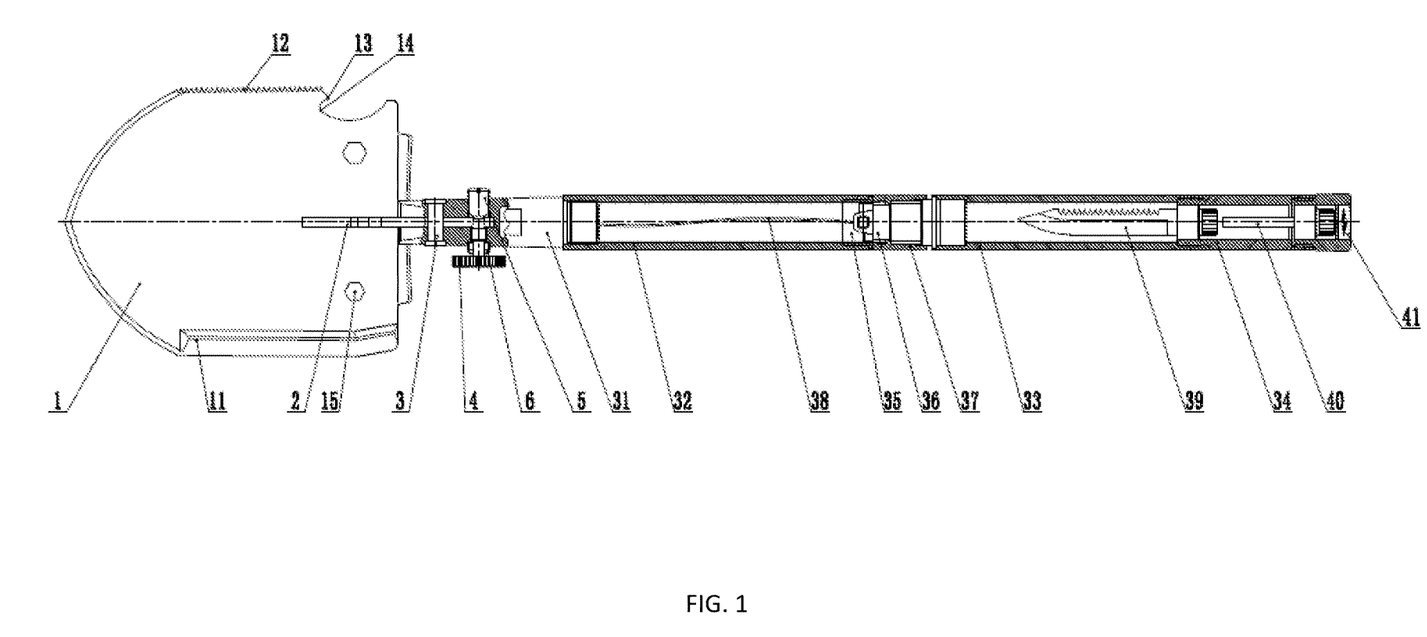
FIG. 1 is a top schematic structural diagram of a multifunctional folding spade according to the present invention.
Figure 2:
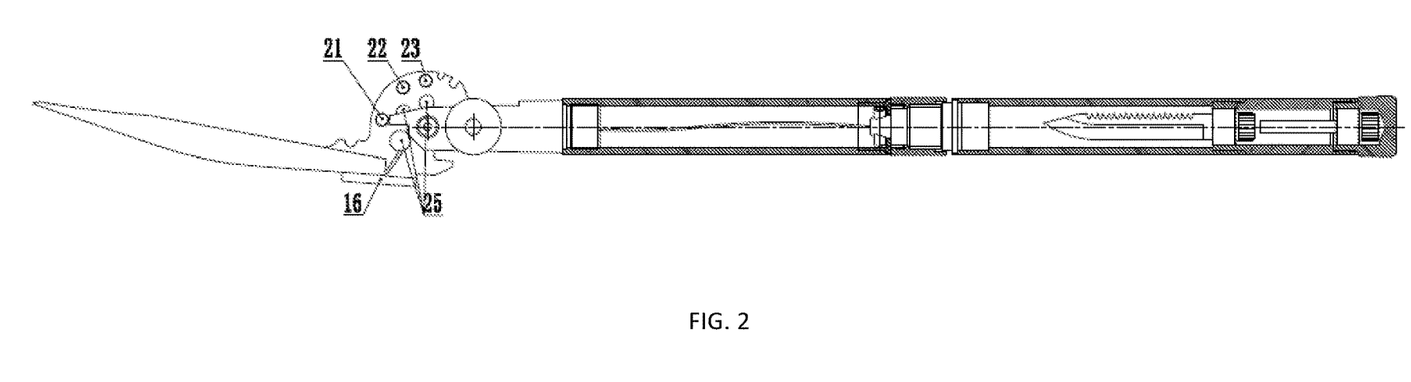
FIG. 2 is a side schematic structural diagram of a multifunctional folding spade according to the present invention, wherein the folding angle of the folding spade in this figure is 180°.
Figure 3:
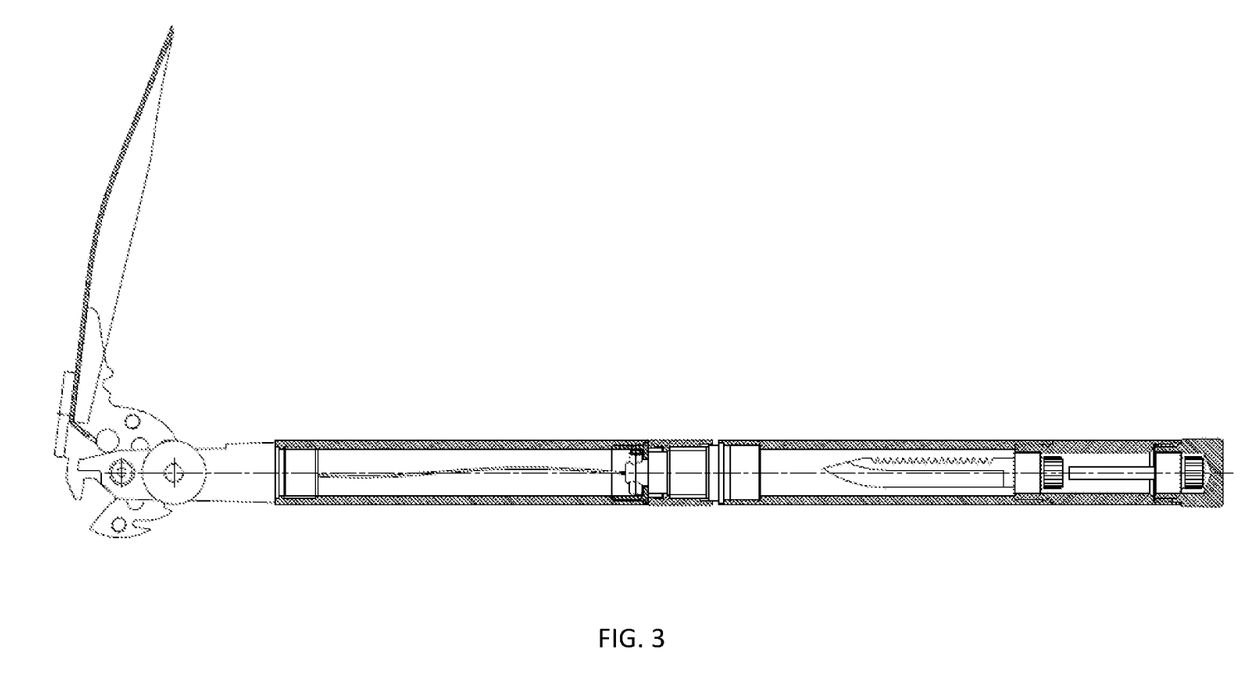
FIG. 3 is a schematic structural diagram of a multifunctional folding spade with a folding angle of 90° according to the present invention.
Figure 4:
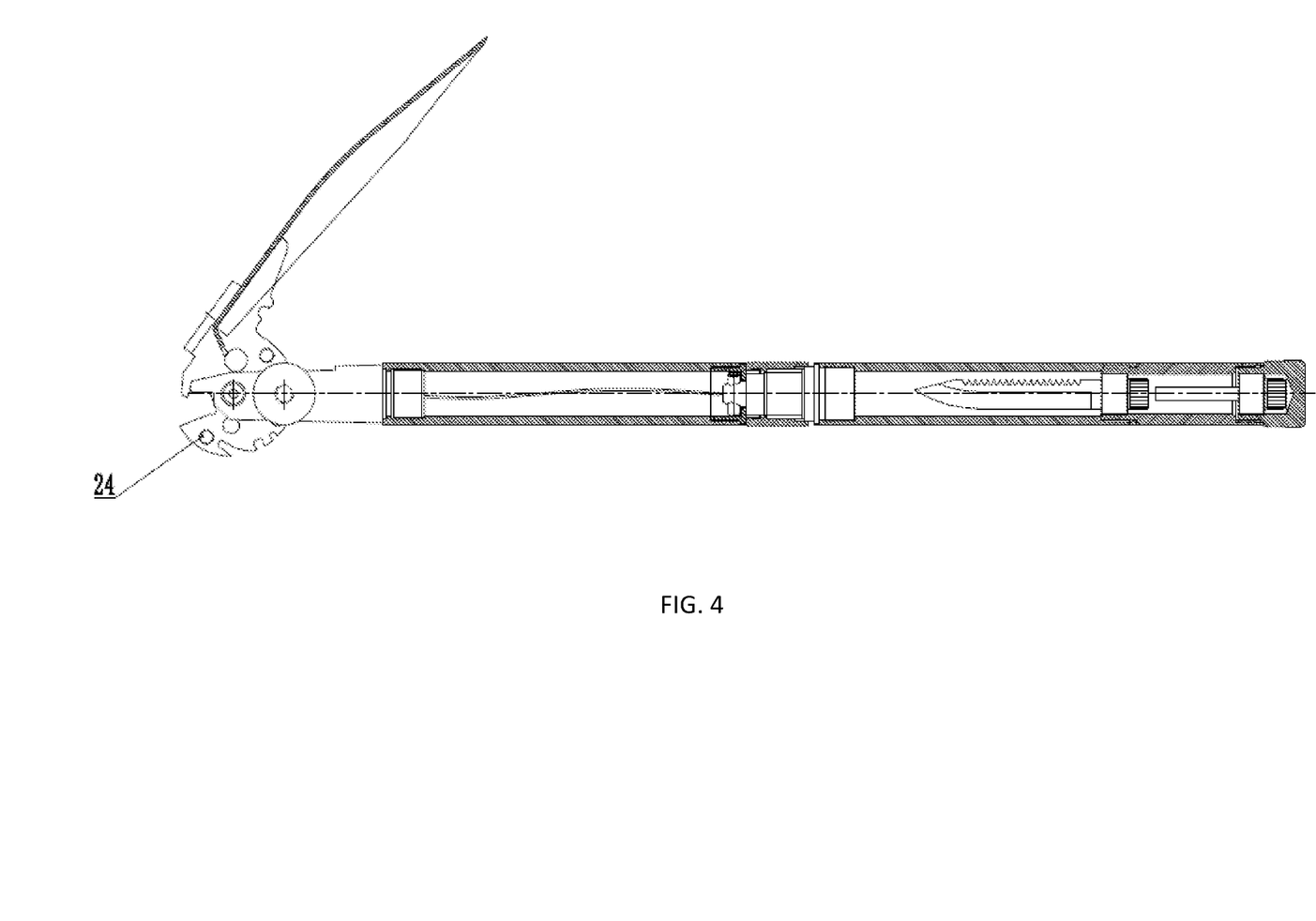
FIG. 4 is a schematic structural diagram of a multifunctional folding spade with a folding angle of 45° according to the present invention.
Figure 5:
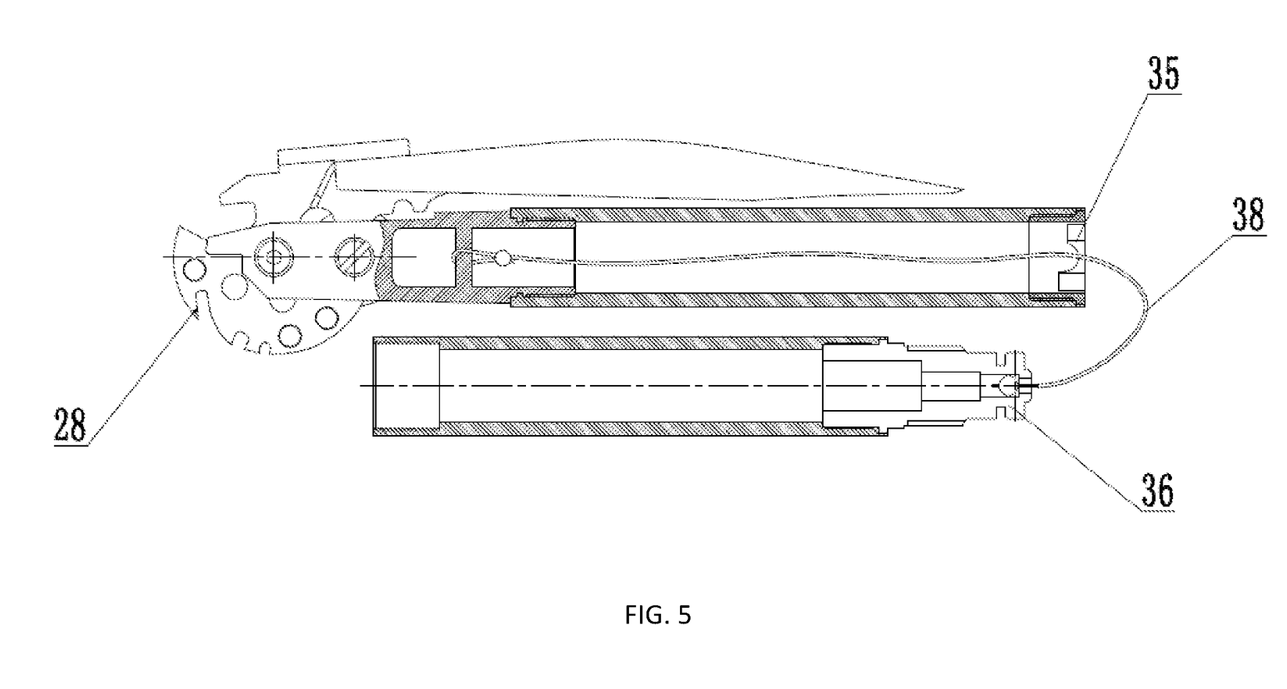
FIG. 5 is a schematic structural diagram of a multifunctional folding spade with a folding angle of 0° according to the present invention.

In this embodiment, the angle adjusting holes specifically comprise a first angle adjusting hole 21, a second angle adjusting hole 22, a third angle adjusting hole 23, and a fourth angle adjusting hole 24 corresponding to the folding angles of the spade plate 1 and the spade handle, which are 0°, 45°, 90° and 180°, respectively. When the folding angle is 0°, it is in the stored state (as shown in FIG. 5). When the folding angle is 45° (as shown in FIG. 4), a rope can tied to the weight-reducing hole 25 of the turntable 2, which can be used as a flying anchor to hook or can be used for hanging objects from a height. When the folding angle is 90° (as shown in FIG. 3), it can be used for digging and picking. When the spade plate 1 and the spade handle are expanded into 180° (as shown in FIG. 2), it can be used for spading, cutting and sawing In this embodiment, a retaining shell 6 is further sleeved outside the locking bolt 4, the inner diameter of the retaining shell 6 is smaller than the outer diameter of the locking end inside the locking bolt 4, and the retaining shell 6 is welded to the spade handle sleeve 31. The retaining shell 6 can prevent the locking bolt 4 from being screwed out of the locking hole, and it will not be lost.

In this embodiment, in order to reduce the overall weight of the spade, the turntable body 2 is further provided with a plurality of hollow weight-reducing holes 25.

Figure 6:
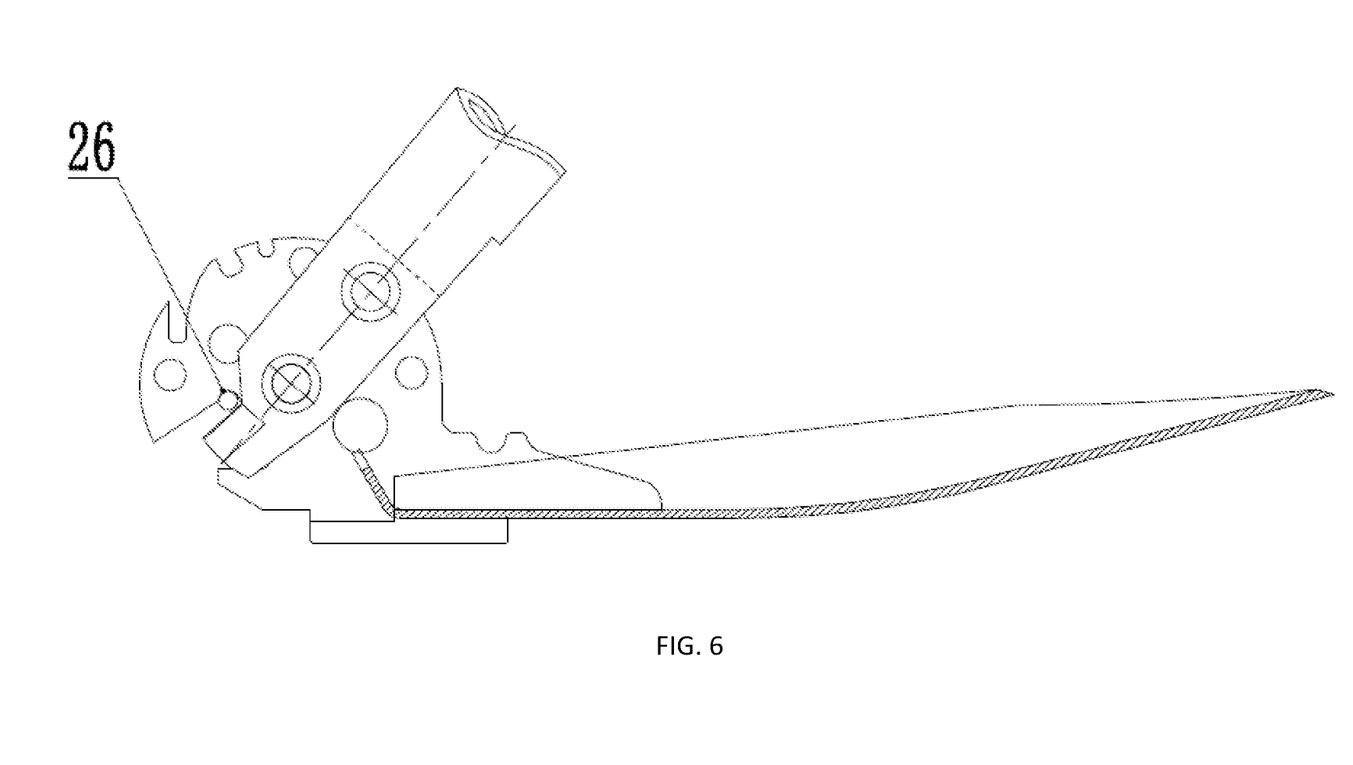
FIG. 6 is a schematic structural diagram of a scissor jaw formed by a turntable and a spade handle sleeve according to the present invention.
Figure 7:
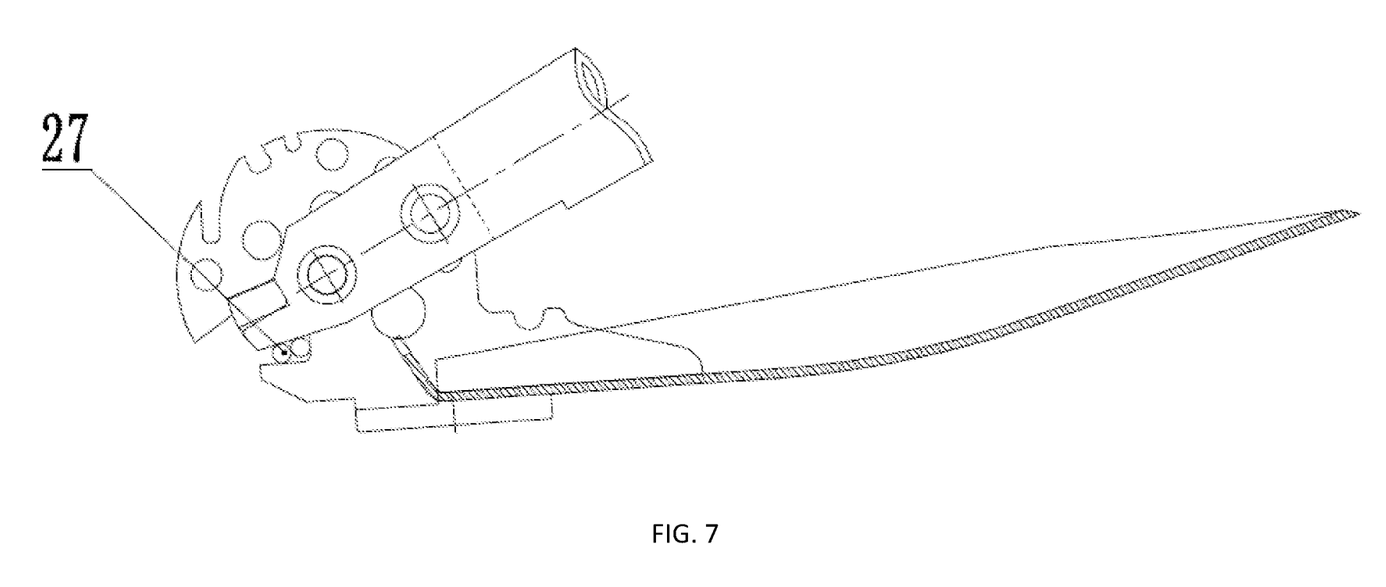
FIG. 7 is a schematic structural view of a binding jaw formed by a turntable and a spade handle sleeve according to the present invention.

In this embodiment, a longitudinal jaw is further provided at the head end of the spade handle sleeve 31, and a groove jaw is provided on the turntable body 2 in cooperation with the jaw, so that the head end of the spade handle sleeve 31 and the turntable 2 are capable of forming a scissor jaw 26 (as shown in FIG. 6). As a result, the jaw can jam the iron wire during the shearing process and can easily cut the wire, and can easily shear the iron wire. The spade handle sleeve 31 at the other side of the longitudinal jaw is capable of forming a crossed binding jaw 27 at the edge of the turntable body 2 (as shown in FIG. 7). That is to say, when the jaw of the spade handle sleeve 31 is opened in the opposite direction of the shear, the jaw can be crossed with the edge of the turntable 2 to form a binding jaw 27, which can bite the two sections of the iron wire at the same time. The spade plate 1 is rotated to screw the two sections of the iron wire together. In addition, a nail puller 28 is molded at the edge of the turntable 2, an arc-shaped notch is formed at the edge of the turntable 2, a slot is longitudinally formed at the notch, and a chamfer is provided inside the slot so that an iron nail cap, which can be used as a nail puller 28, can be inserted into the slot.

In this embodiment, one side of the spade plate 1 is provided with a thickened hacking knife 11, and saw teeth 12 are processed at the edge of the other side of the spade plate 1; in the specific processing and manufacturing process, a 4.5 mm thick blank plate is heated to 1100°. The blank plate is thinned to 1.5 mm using a grooved roller. There is a protruding vertical rib at the groove, and the thickness of the vertical rib is 4.5 mm. The vertical rib is aligned with the hacking knife of the spade plate 1. A die is used to punch and shear the spade plate 1 into a spade shape, so that a spade plate 1 with a 1.5 mm thick spade surface and a 4.5 mm thick hacking knife is obtained; for the saw teeth 12, the saw teeth 12 of an odd number are pulled to one side, and the saw teeth 12 of an even number are pulled to the opposite side, so that the width of the saw teeth 12 is greater than the thickness of the spade plate 1. The saw will not be caught when sawing trees, and work can be done when sawing trees back and forth.

In this embodiment, a bottle opener 13 and an umbrella rope knife 14 are further provided at the edge of the side of the spade plate 1 provided with the saw teeth 12, and the body of the spade plate 1 is symmetrically provided with two hexagonal wrench holes 15 at both sides of the turntable 2. The bottle opener 13, the umbrella rode knife 14 and the hexagonal wrench hole 15 can be molded directly on the spade plate 1.

In this embodiment, the back surface of the spade plate 1 is further provided with a hammer surface 16, and the hammer surface 16 is welded to the bottom of the turntable 2. The hammer surface can be used as a hammer head when the spade handle and the spade plate 1 are folded to 0°.

In this embodiment, the spade handle is provided with a plurality of sections, and comprises a first spade handle 32, a second spade handle 33 and a third spade handle 34 in order from the head end to the tail end, wherein the head end of the first spade handle 32 is threadedly connected to the spade handle sleeve 31, the tail end of the first spade handle 32 is threadedly connected to a locking base 35, the interior of the locking base 35 is a T-shaped cavity, the head end of the second spade handle 33 is provided with a locking head 36, the locking head 36 is a T-shaped locking head provided in cooperation with the T-shaped cavity, a locking nut 37 is sleeved outside the locking head 36, the locking head 36 is inserted into the T-shaped cavity of the locking base 35, and the locking head 36 is rotated by 90° to be jammed with the locking base 35 and then is locked with the locking nut 37, so that when the spade is in use, it can realize the quick connection of the spade handle, and the connection of the spade handle will not be loosened when being vibrated in use.

In order to prevent the spade handle from being easily lost when the first spade handle 32 and the second spade handle 33 are unscrewed, the first spade handle 32 and the second spade handle 33 are connected by an elastic soft rope 38, one end of the elastic soft rope 38 is connected to the head end of the first spade handle 32, and the other end thereof is connected to the locking head 36 of the head end of the second spade handle 33 through the inner cavity of the first spade handle 32.

In addition, an outdoor knife 39 and a fire rod 40 are further threadedly connected to the cavities of the second spade handle 33 and the third spade handle 34, respectively, and a compass 41 is further inlaid at the tail end of the third spade handle 34.

The present invention uses specific examples to explain the principles and implementations of the present invention. The description of the above examples is only used to help understand the method of the present invention and its core ideas; meanwhile, for those skilled in the art, according to the idea of the present invention, there will be changes in the specific implementation and application scope. In summary, the contents of this specification should not be construed as limiting the present invention.

What is claimed is:

1. A multifunctional folding spade, comprising a spade plate and a spade handle, wherein a turntable is welded at a tail end of the spade plate, a spade handle sleeve is provided at a head end of the spade handle, a socket is provided at the head end of the spade handle sleeve, a part of the turntable body is inserted into the socket, the turntable and the spade handle sleeve are provided with matching rotation holes, and a pin shaft passes through the rotation holes to realize the rotating connection between the turntable and the spade handle; the turntable body is further provided with a plurality of angle adjusting holes circumferentially, a locking hole is provided with at the tail end of the spade handle sleeve correspondingly, a locking bolt is provided at one side of the locking hole, a positioning marble is provided at the other side of the locking hole opposite to the locking bolt, the turntable is rotated so that the positioning marble is capable of sinking into any of the angle adjusting holes to position the turntable, and the locking end inside the locking bolt is screwed into the angle adjusting hole at the other side of the spade handle sleeve to lock the turntable; a retaining shell is further connected to the locking bolt, and the retaining shell is welded to the spade handle sleeve; and wherein the spade handle is provided with a plurality of sections, and comprises a first spade handle, a second spade handle and a third spade handle in order from the head end to the tail end, wherein the head end of the first spade handle is threadedly connected to the spade handle sleeve, the tail end of the first spade handle is threadedly connected to a locking base, the interior of the locking base is a T-shaped cavity, the head end of the second spade handle is provided with a locking head, the locking head is a T-shaped locking head provided in cooperation with the T-shaped cavity, a locking nut is sleeved outside the locking head; the first spade handle and the second spade handle are connected by an elastic soft rope, one end of the elastic soft rope is connected to the head end of the first spade handle, and the other end thereof is connected to the locking head at the head end of the second spade handle through the inner cavity of the first spade handle.

2. The multifunctional folding spade according to claim 1, wherein the turntable body is further provided with a plurality of weight-reducing holes.

3. The multifunctional folding spade according to claim 1, wherein: a longitudinal jaw is further provided at the head end of the spade handle sleeve, a groove jaw is provided on the turntable body in cooperation with the jaw, so that the head end of the spade handle sleeve and the turntable are capable of forming a scissor jaw; and the spade handle sleeve at the other side of the longitudinal jaw is capable of forming a crossed binding jaw at the edge of the turntable body.

4. The multifunctional folding spade according to claim 1, wherein a nail puller is molded at the edge of the turntable.

5. The multifunctional folding spade according to claim 1, wherein one side of the spade plate is provided with a thickened hacking knife, and saw teeth are processed at the edge of the other side of the spade plate.

6. The multifunctional folding spade according to claim 5, wherein: a bottle opener and an umbrella rope knife are further provided at the edge of the side of the spade plate provided with the saw teeth, and the body of the spade plate is symmetrically provided with two hexagonal wrench holes at both sides of the turntable.

7. The multifunctional folding spade according to claim 1, wherein the back surface of the spade plate is further provided with a hammer surface, and the hammer surface is welded to the bottom of the turntable.

8. The multifunctional folding spade according to claim 1, wherein an outdoor knife and a fire rod are further provided in the cavities of the second spade handle and the third spade handle, respectively, and a compass is further inlaid at the tail end of the third spade handle.

* * * * *